United States Patent
Calderon et al.

(10) Patent No.: US 10,564,064 B2
(45) Date of Patent: Feb. 18, 2020

(54) METHOD OF LEAK TESTING A LOW CONDUCTIVITY PART

(71) Applicant: GM GLOBAL TECHNOLOGY OPERATIONS LLC, Detroit, MI (US)

(72) Inventors: Edgar P. Calderon, Sterling Heights, MI (US); Roger M. Brisbane, Washington, MI (US); Herman K. Phlegm, West Bloomfield, MI (US)

(73) Assignee: GM Global Technology Operations LLC, Detroit, MI (US)

(*) Notice: Subject to any disclaimer, the term of this patent is extended or adjusted under 35 U.S.C. 154(b) by 74 days.

(21) Appl. No.: 15/434,137

(22) Filed: Feb. 16, 2017

(65) Prior Publication Data
US 2018/0231368 A1    Aug. 16, 2018

(51) Int. Cl.
*G01B 7/06* (2006.01)
*G01M 3/40* (2006.01)

(52) U.S. Cl.
CPC .................................... *G01M 3/40* (2013.01)

(58) Field of Classification Search
CPC ........ G01B 7/06; G01M 3/40; A61M 2205/15
See application file for complete search history.

(56) References Cited

U.S. PATENT DOCUMENTS

| | | | | |
|---|---|---|---|---|
| 4,110,739 A | * | 8/1978 | Kidd | B65D 90/506 |
| | | | | 174/120 SC |
| 4,677,371 A | * | 6/1987 | Imaizumi | G01M 3/165 |
| | | | | 174/11 R |
| 5,214,387 A | * | 5/1993 | Fenner | G01M 3/16 |
| | | | | 324/557 |
| 9,347,590 B2 | * | 5/2016 | Strohmer | F16L 9/125 |
| 2002/0189324 A1 | * | 12/2002 | Lipscomb | G01N 35/1009 |
| | | | | 73/37 |
| 2002/0189326 A1 | * | 12/2002 | Jang et al. | G01M 3/04 |
| | | | | 73/40 |
| 2005/0188750 A1 | * | 9/2005 | Goad | G01M 3/186 |
| | | | | 73/40 |
| 2014/0282286 A1 | * | 9/2014 | Yang | G03F 1/70 |
| | | | | 716/51 |
| 2016/0273995 A1 | * | 9/2016 | Dandekar | G01M 3/18 |

* cited by examiner

*Primary Examiner* — Neel D Shah
(74) *Attorney, Agent, or Firm* — Quinn IP Law

(57) ABSTRACT

A method of leak testing a fluid passage of a part manufactured from a low conductivity material includes measuring an electrical resistance between an interior wall surface of the fluid passage of the part, and an exterior wall surface of the fluid passage of the part. The measured electrical resistance is compared to a threshold value to determine if the measured electrical resistance is equal to or greater than the threshold value, or if the measured electrical resistance is less than the threshold value. The threshold value is equal to a nominal wall thickness of the fluid passage multiplied by a resistivity of the material used to form the part. The part passes the leak test when the measured electrical resistance is equal to or greater than the threshold value. The part fails the leak test when the measured electrical resistance is less than the threshold value.

17 Claims, 2 Drawing Sheets

METHOD OF LEAK TESTING A LOW CONDUCTIVITY PART

The disclosure generally relates to a method of leak testing a fluid passage of a part manufactured from a low conductivity material.

Many parts manufactured from low conductivity materials include a fluid passage for conducting a fluid, such as a cooling liquid. Low conductivity materials may include, but are not limited to, insulator materials, such as plastic, glass, rubber, etc. Furthermore, low conductivity materials may include materials having a resistivity equal to or greater than $1.0 \times 10^{12}$ Ohms-cm. Any porosity in a wall forming the fluid passage may allow fluid leakage through the wall of the fluid passage. Such porosity may be so small that it is difficult to detect. Depending upon the specific application and use of the part, it may be desirable to leak test the fluid passage before assembly.

SUMMARY

A method of leak testing a fluid passage of a part manufactured from a low conductivity material is provided. In one embodiment, the part is a repeating frame of a battery cell. The method includes measuring an electrical resistance between an interior wall surface of the fluid passage of the part, and an exterior wall surface of the fluid passage of the part. The electrical resistance is measured with an electrical resistance tester. The measured electrical resistance is compared to a threshold value to determine if the measured electrical resistance is equal to or greater than the threshold value, or if the measured electrical resistance is less than the threshold value. A passed leak test is identified when the measured electrical resistance is equal to or greater than the threshold value. A failed leak test is identified when the measured electrical resistance is less than the threshold value.

In one aspect of the method of leak testing the part, measuring the electrical resistance includes positioning a first test probe of the electrical resistance tester in contact with the exterior wall surface of the fluid passage, and positioning a second test probe of the electrical resistance tester in contact with the interior wall surface of the fluid passage. A test voltage may then be applied to one of the first test probe and the second test probe, and the resistance through the wall forming the fluid passage may then be measured. In one exemplary embodiment, the test voltage is approximately equal to 1000 volts.

In another aspect of the method of leak testing the part, the threshold value is calculated. The threshold value is calculated based on the resistivity of the low conductivity material used to form the part. A nominal wall thickness of the low conductivity material used to form the part is measured between the exterior wall surface of the fluid passage and the interior wall surface of the fluid passage. The resistivity of the low conductivity material used to form the part is then multiplied by the nominal wall thickness of the fluid passage to obtain the threshold value.

In one exemplary embodiment of the method of leak testing the part, the low conductivity material used to form the part includes a resistivity equal to or greater than $1 \times 10^{12}$ Ohm-cm. In another exemplary embodiment of the method of leak testing the part, the low conductivity material used to form the part includes a resistivity equal to or greater than $1 \times 10^{17}$ Ohm-cm.

In another aspect of the method of leak testing the part, the part may be dried before measuring the electrical resistance between the interior wall surface of the fluid passage and the exterior wall surface of the fluid passage. Drying the part may include removing surface moisture from the part.

Accordingly, the resistance of the low conductivity material to the applied test voltage, between the exterior wall surface and the interior wall surface of the wall forming the fluid passage, may be used to indicate porosity in the wall, which may lead to fluid leakage through the wall of the fluid passage. If the resistance is low, reflecting a relative ease for the test voltage to flow through the wall of the fluid passage, then the wall may be porous and possibly allow fluid leakage through the wall. As such, a low resistance to the test voltage may be used to identify a porous wall structure, which is undesirable for the fluid passage.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the FIGS., wherein like numerals indicate like parts throughout the several views, a method of leak testing a fluid passage 20 of a part 22 is described. The part 22 may include any structure that is manufactured from a low conductivity material, and which defines or forms the fluid passage 20 for conducting a fluid through the passage.

Figure 1:
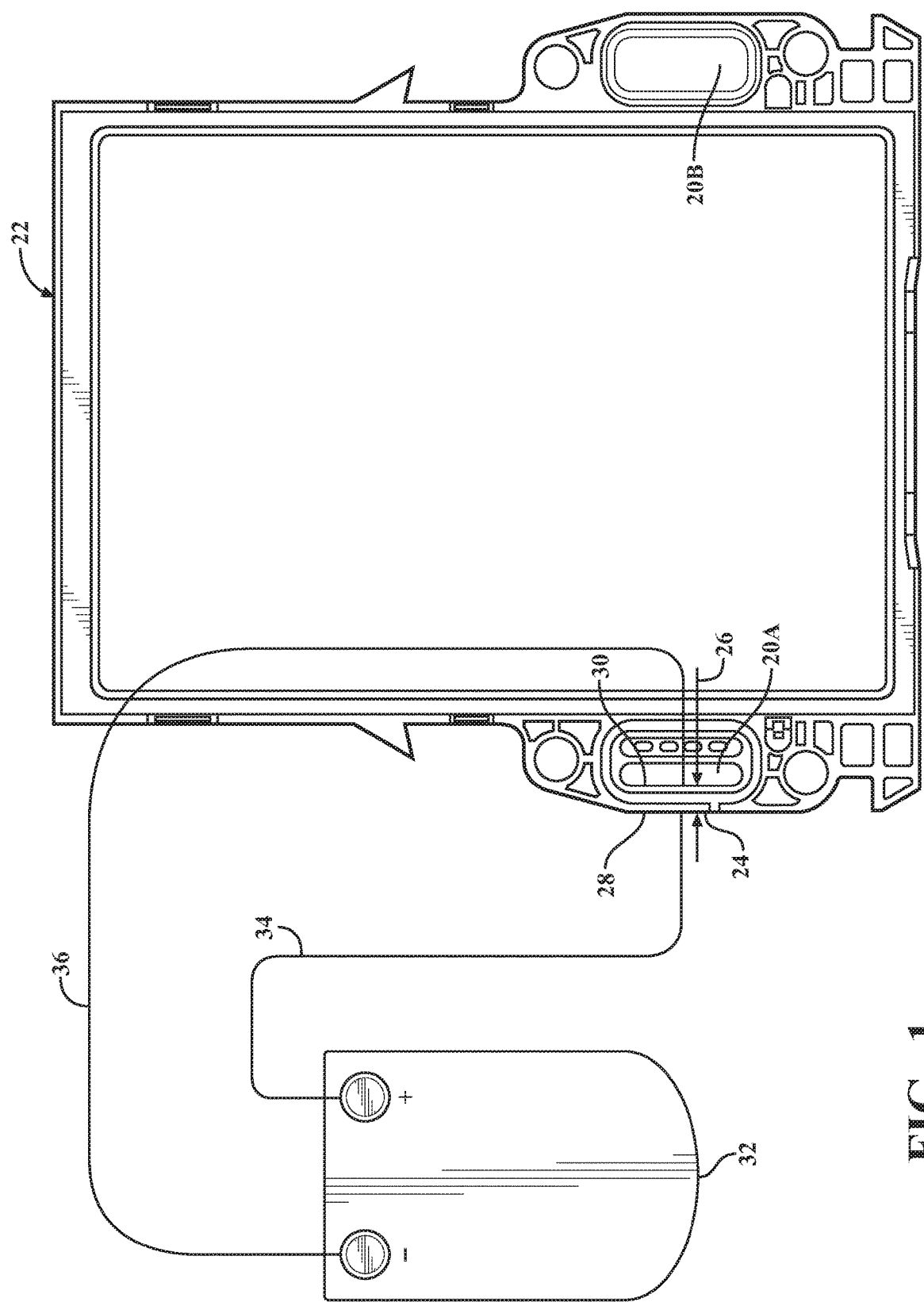
FIG. 1 is a schematic plan view of an electrical resistance tester connected to a part for leak testing a fluid passage in the part.

Referring to FIG. 1, an exemplary embodiment of the part 22 is embodied as a repeating frame 22 for a battery cell. The repeating frame 22 is manufactured from a plastic material having a low conductivity, i.e., a low conductivity material. The repeating frame 22 defines a first fluid passage 20A and a second fluid passage 20B. The first fluid passage 20A and the second fluid passage 20B are configured for conducting a pressurized cooling liquid therethrough for cooling the battery cell. While the fluid that is to flow through the fluid passages 20A, 20B of the exemplary embodiment of the repeating frame 22 is a cooling liquid, it should be appreciated that the fluid may include some other type of fluid, and need not be a liquid. Although the exemplary embodiment of the repeating frame 22 includes the first fluid passage 20A and the second fluid passage 20B, the description below refers to only one fluid passage 20. It should be appreciated that the description related to the fluid passage 20 is applicable to either of the first fluid passage 20A and/or the second fluid passage 20B, although not specifically described. When in use, cooling liquid in the fluid passage 20 is pressurized. As such, porosity in a wall 24 of the repeating frame 22 that forms the fluid passage 20 may allow the pressurized cooling liquid in the fluid passage 20 to leak through the wall 24 to an exterior of the fluid passage 20. In order to verify proper functionality of the fluid passage 20, the fluid passage 20 of the part 22 may be leak tested according to the process described below.

As used herein, the term "low conductivity material", or a material described as having a "low conductivity" is defined to include any material that exhibits a resistivity equal to or greater than $1.03 \times 10^{12}$ Ohms-cm, i.e., 1.03 TOhms-cm. In the exemplary embodiment shown in FIG. 1, the repeating frame 22 is manufactured from a plastic material that exhibits a resistivity that is equal to or greater than $1 \times 10^{17}$ Ohm-cm. However, it should be appreciated that the resistivity of the part 22 may differ from the exemplary embodiment of the repeating frame 22 that is shown and described herein.

Figure 2:
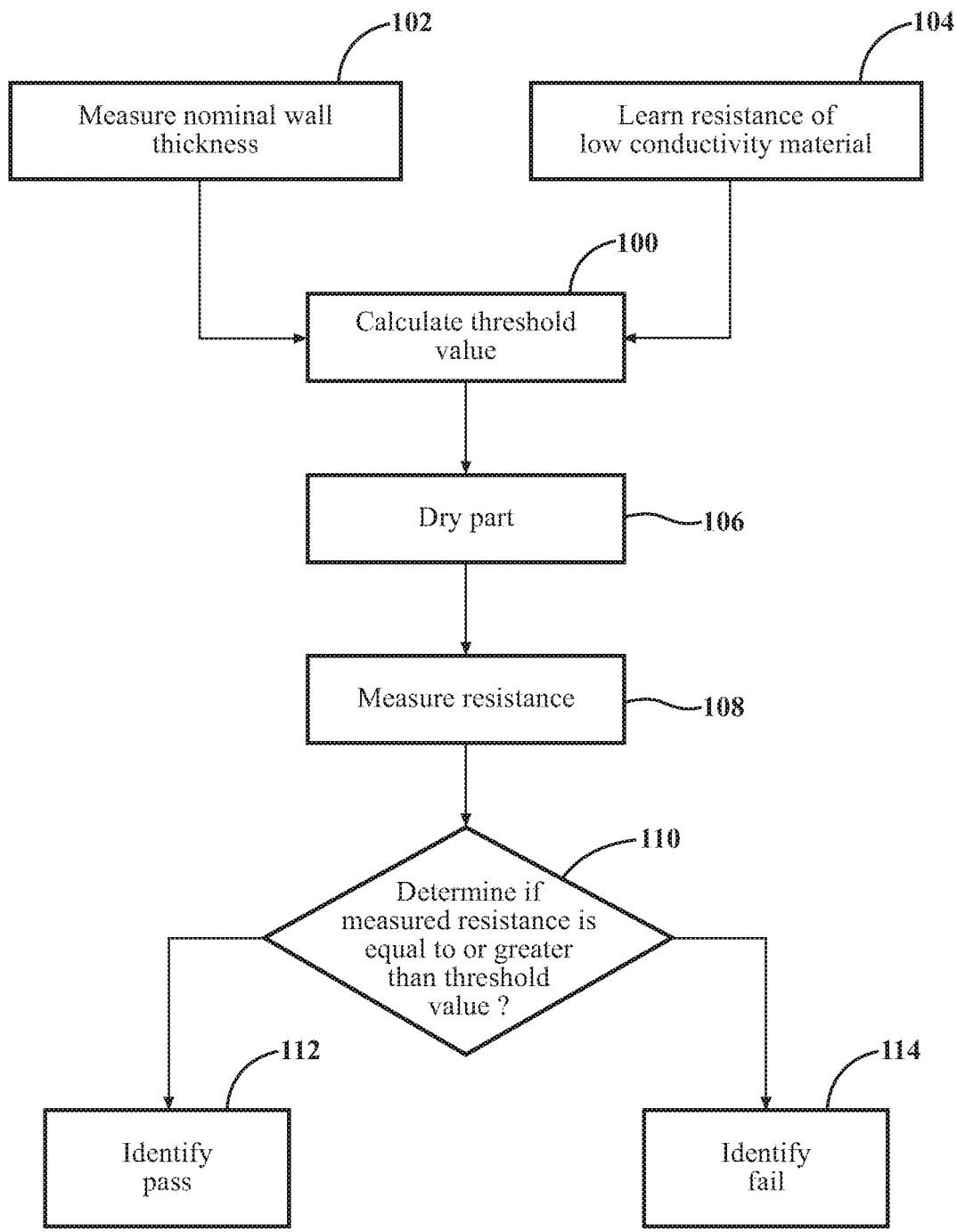
FIG. 2 is a flowchart representing a method of leak testing the part.

The process for leak testing the part 22, e.g., the repeating frame 22, includes calculating a threshold value. The step of calculating the threshold value is generally indicated by box 100 in FIG. 2. The threshold value is an ideal electrical resistance that should be exhibited by the wall 24 forming the fluid passage 20. The threshold value is based on the resistivity of the low conductivity material used to form the part 22, and a nominal wall thickness 26 of the wall 24 forming the fluid passage 20. The nominal wall thickness 26 is measured between an exterior wall surface 28 of the fluid passage 20, and an interior wall surface 30 of the fluid passage 20. The step of measuring the nominal wall thickness 26 is generally indicated by box 102 in FIG. 2. It should be appreciated that the exact wall 24 thickness may vary depending upon the manufacturing tolerances, and upon the specific design and/or shape of the wall 24 perpendicular to a longitudinal axis or flow path of the fluid passage 20. The nominal wall thickness 26 may be measured in any suitable manner, including measuring with a measuring device such as calipers, 3D scanning, referencing a scalable part 22 sheet or CAD file, etc. The nominal wall thickness 26 is measured in a direction that is generally perpendicular to the longitudinal axis or flow path of the fluid passage 20.

The resistivity of the low conductivity material used to form the part 22 is a known material property of that material, and may be obtained by referencing material data sheets for that material, or through empirical testing. The step of learning the resistivity of the low conductivity material is generally indicated by box 104 in FIG. 2. Once the resistivity of the low conductivity material is known, and the nominal wall thickness 26 has been measured, the threshold value may be calculated by multiplying the resistivity of the low conductivity material by the nominal wall thickness 26 of the wall 24 forming the fluid passage 20.

The part 22 must be free of any surface moisture in order for the leak testing process to provide accurate results. Accordingly, the process may include drying the part 22. The step of drying the part 22 is generally indicated by box 106 in FIG. 2. As used herein, the term "drying" or "dry" should be interpreted as removing the surface moisture from the part 22. It should be appreciated that some moisture may be present within the structure of the part 22, i.e., moisture absorbed by the part 22, and that drying the part 22 does not include or require removing all moisture from the part 22, but rather the surface moisture on the part 22. The part 22 may be dried in any suitable manner that is capable of removing the surface moisture from the part 22. In one embodiment, the leak testing procedure occurs shortly after the part 22 has been formed and removed from a forming die, so that the part 22 does not include any surface moisture. In other embodiments, the part 22 may be placed in a drier or oven to remove the surface moisture. It should be appreciated that the part 22 may be dried in some other manner than described herein.

Once the part 22 has been dried, an electrical resistance is measured between an interior wall surface 30 of the fluid passage 20 of the part 22, and an exterior wall surface 28 of the fluid passage 20 of the part 22. The step of measuring the electrical resistance is generally indicated by box 108 in FIG. 2. The electrical resistance may be measured in any suitable manner. For example, an electrical resistance tester 32 may be used to measure the electrical resistance. Electrical resistance testers are readily available, and known to those skilled in the art. The electrical resistance tester 32 may include a first test probe 34 that applies a test voltage to the part 22, e.g., a positive probe, and a second test probe 36 that senses an electrical current being conducted through the part 22, e.g., a negative or ground probe. The electrical resistance tester 32 includes all circuitry and components necessary to measure and/or calculate the resistance of the part 22, between the first test probe 34 and the second test probe 36.

One of the first test probe 34 and the second test probe 36 is positioned against and in contact with the exterior wall surface 28 of the wall 24 forming the fluid passage 20, and the other of the first test probe 34 and the second test probe 36 is positioned against and in contact with the interior wall surface 30 of the wall 24 forming the fluid passage 20. Accordingly, the first test probe 34 and the second test probe 36 are spaced apart 22 from each other a distance that is approximately equal to the nominal wall thickness 26 of the wall 24 forming the fluid passage 20. As shown in the FIG. 1, the first test probe 34 is positioned against the exterior wall surface 28 of the fluid passage 20, and the interior test probe is positioned against the interior wall surface 30 of the fluid passage 20, such that the test voltage is applied to the exterior wall surface 28 of the fluid passage 20. However, it should be appreciated that the relative positions of the first test probe 34 and the second test probe 36 may be reversed, such that the test voltage is applied to the interior wall surface 30 of the fluid passage 20.

Once the first test probe 34 and the second test probe 36 are positioned, the electrical resistance tester 32 may be controlled to apply the test voltage to the first test probe 34. In the exemplary embodiment of the repeating frame 22 shown in the Figures and described herein, the test voltage is approximately equal to 1000 volts. However, it should be appreciated that the test voltage may vary from the exemplary embodiment shown and described herein, and may be more or less than the exemplary 1000 volt test voltage.

The electrical resistance tester 32 measures and/or calculates the resistance of the wall 24 forming the fluid passage 20 to the applied test voltage, between the first test probe 34 and the second test probe 36. The measured electrical resistance may then be compared to the threshold value to determine if the measured electrical resistance is equal to or greater than a threshold value, or if the measured electrical resistance is less than the threshold value. The step of comparing the measured electrical resistance to the threshold value is generally indicated by box 110 in FIG. 2. The part 22 passes the leak test when the measured electrical resistance is equal to or greater than the threshold value. The part 22 fails the leak test when the measured electrical resistance is less than the threshold value.

When the measured electrical resistance is equal to or greater than the threshold value, i.e., the part 22 passes the leak test process, then a test operator or test controller may identify or signal a passed leak test. The step of identifying the passed leak test is generally indicated by box 112 in FIG. 2. Similarly, when the measured electrical resistance is less than the threshold value, i.e., the part 22 fails the leak test process, then the test operator or the test controller may identify or signal a failed leak test. The step of identifying the failed leak test is generally indicated by box 114 in FIG. 2. The passed leak test and/or the failed leak test may be identified or signaled in any manner. For example, the test operator may mark the part 22 "passed" or "failed", may place the part 22 in an appropriate bin for passed parts or failed parts respectively. Alternatively, if the process is computerized, a test controller may signal the passed leak test or the failed leak test via a visual indication such as a green light or a red light, or may save the measured electrical resistance on a data file for reference, etc.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A method of leak testing a fluid passage of a part manufactured from a low conductivity material, the method comprising:
    measuring an electrical resistance between an interior wall surface of the fluid passage of the part and an exterior wall surface of the fluid passage of the part, with an electrical resistance tester, wherein measuring the electrical resistance includes positioning a first test probe of the electrical resistance tester in contact with the exterior wall surface of the fluid passage, and positioning a second test probe of the electrical resistance tester in contact with the interior wall surface of the fluid passage;
    determining if the measured electrical resistance is equal to or greater than a threshold value, or if the measured electrical resistance is less than the threshold value;
    identifying a passed leak test when the measured electrical resistance is equal to or greater than the threshold value;
    identifying a failed leak test when the measured electrical resistance is less than the threshold value; and
    calculating the threshold value based on the resistivity of the low conductivity material.

2. The method set forth in claim 1, wherein measuring the electrical resistance includes applying a test voltage to one of the first test probe and the second test probe.

3. The method set forth in claim 2, wherein the test voltage is approximately equal to 1000 volts.

4. The method set forth in claim 1, wherein calculating the threshold value includes measuring a nominal wall thickness of the low conductivity material between the exterior wall surface of the fluid passage and the interior wall surface of the fluid passage.

5. The method set forth in claim 4, wherein calculating the threshold value includes multiplying the resistivity of the low conductivity material by the nominal wall thickness of the fluid passage to obtain the threshold value.

6. The method set forth in claim 1, wherein the low conductivity material includes a resistivity equal to or greater than $1 \times 10^{12}$ Ohm-cm.

7. The method set forth in claim 1, further comprising drying the part before measuring the electrical resistance between the interior wall surface of the fluid passage and the exterior wall surface of the fluid passage.

8. The method set forth in claim 7, wherein drying the part is further defined as removing surface moisture from the part.

9. A method of leak testing a fluid passage of a repeating frame of a battery cell, the method comprising:
    calculating a threshold value by multiplying a resistivity of a low conductivity material forming the repeating frame by a nominal wall thickness measured between an exterior wall surface and an interior wall surface of the fluid passage of the repeating frame;
    measuring an electrical resistance between the interior wall surface of the fluid passage of the repeating frame and the exterior wall surface of the fluid passage of the repeating frame, with an electrical resistance tester, wherein measuring the electrical resistance includes positioning a first test probe of the electrical resistance tester in contact with the exterior wall surface of the fluid passage, and positioning a second test probe of the electrical resistance tester in contact with the interior wall surface of the fluid passage;
    determining if the measured electrical resistance is equal to or greater than the threshold value, or if the measured electrical resistance is less than the threshold value;
    signaling a passed leak test when the measured electrical resistance is equal to or greater than the threshold value; and
    signaling a failed leak test when the measured electrical resistance is less than the threshold value.

10. The method set forth in claim 9, wherein measuring the electrical resistance includes applying a test voltage to one of the first test probe and the second test probe.

11. The method set forth in claim 10, wherein the test voltage is approximately equal to 1000 volts.

12. The method set forth in claim 9, further comprising measuring the nominal wall thickness between the exterior wall surface of the fluid passage and the interior wall surface of the fluid passage.

13. The method set forth in claim 9, wherein the resistivity of the low conductivity material forming the repeating frame is equal to or greater than $1 \times 10^{12}$ Ohm-cm.

14. The method set forth in claim 13, wherein the resistivity of the low conductivity material forming the repeating frame is equal to or greater than $1 \times 10^{17}$ Ohm-cm.

15. The method set forth in claim 14, wherein the threshold value is approximately equal to $1 \times 10^{12}$ Ohm.

16. The method set forth in claim 9, further comprising drying the repeating frame before measuring the electrical resistance between the interior wall surface of the fluid passage and the exterior wall surface of the fluid passage.

17. The method set forth in claim 16, wherein drying the repeating frame is further defined as removing surface moisture from the repeating frame.

* * * * *